US007051515B2

United States Patent
Schnaibel et al.

(10) Patent No.: US 7,051,515 B2
(45) Date of Patent: May 30, 2006

(54) METHOD AND MODEL FOR MODELING A DISCHARGE PHASE OF A NITROUS OXIDE STORAGE CATALYTIC CONVERTER

(75) Inventors: Eberhard Schnaibel, Hemmingen (DE); Klaus Winkler, Rutesheim (DE); Klaus Hirschmann, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 356 days.

(21) Appl. No.: 10/344,745

(22) PCT Filed: Jul. 20, 2001

(86) PCT No.: PCT/DE01/02749

§ 371 (c)(1),
(2), (4) Date: Feb. 14, 2003

(87) PCT Pub. No.: WO02/14659

PCT Pub. Date: Feb. 21, 2002

(65) Prior Publication Data

US 2003/0172645 A1  Sep. 18, 2003

(30) Foreign Application Priority Data

Aug. 14, 2000   (DE) .......................... 100 39 708

(51) Int. Cl.
*F01N 3/00* (2006.01)

(52) U.S. Cl. ........................ 60/285; 60/274; 60/276; 701/103

(58) Field of Classification Search ............... 60/274, 60/276, 277, 285; 701/103, 109
See application file for complete search history.

(56) References Cited

U.S. PATENT DOCUMENTS

| 5,970,707 | A | * | 10/1999 | Sawada et al. | ............... 60/277 |
| 6,101,809 | A | * | 8/2000 | Ishizuka et al. | ............... 60/276 |
| 6,185,929 | B1 | * | 2/2001 | Ishizuka et al. | ............... 60/274 |
| 6,216,451 | B1 | * | 4/2001 | Schnaibel et al. | ............ 60/277 |
| 6,336,320 | B1 | * | 1/2002 | Tanaka et al. | ................ 60/285 |
| 6,766,640 | B1 | * | 7/2004 | Ishizuka et al. | ............... 60/285 |

FOREIGN PATENT DOCUMENTS

| DE | 199 18 875 | 10/1999 |
| EP | 0 997 617 | 5/2000 |
| EP | 0 997 626 | 5/2000 |
| FR | 2 746 142 | 9/1997 |
| WO | WO 00 34631 | 6/2000 |

* cited by examiner

*Primary Examiner*—Tu M. Nguyen
(74) *Attorney, Agent, or Firm*—Walter Ottesen

(57) ABSTRACT

The invention further relates to a method and a model for modeling a discharge phase of a nitrogen oxide (NOx)-storage catalytic converter (12') of an internal combustion engine (1). The NOx-storage catalytic converter (12') is subdivision into an oxygen (O2)-store and a nitrogen oxide (NOx)-store and a reducing agent mass flow (msrg) is determined which charges the O2-store and the NOx-store. To model a discharge phase of the NOx-storage catalytic converter (12'), the O2-store is modeled via a first integrator for oxygen (O2) and the NOx-store via a second integrator for nitrogen oxide (NOx) and the first integrator and the second integrator are charge proportionally with the reducing agent mass flow (msrg) in accordance with an apportioning factor determined in dependence upon the O2-store content (mo2sp) and the NOx-store content (mnosp) of the NOx-storage catalytic converter (12').

12 Claims, 3 Drawing Sheets

US 7,051,515 B2

METHOD AND MODEL FOR MODELING A DISCHARGE PHASE OF A NITROUS OXIDE STORAGE CATALYTIC CONVERTER

This application is the U.S. national stage of international application No. PCT/DE 01/02749, filed Jul. 20, 2001, designating the United States.

FIELD OF THE INVENTION

The present invention relates to a method for modeling a discharge phase of a nitrogen oxide (NOx)-storage catalytic converter of an internal combustion engine, especially of a motor vehicle. The NOx-storage catalytic converter is subdivided into an oxygen (O2)-store and a nitrogen oxide (NOx)-store. A reducing agent mass flow is determined which charges the O2-store and the NOx-store.

The invention further relates to a model for modeling a discharge phase of an NOx-storage catalytic converter of an internal combustion engine, especially of a motor vehicle. The model includes a subdivision of the NOx-storage catalytic converter into an O2-store and NOx-store and a reducing agent mass flow which charges the O2-store and the NOx-store.

The present invention further relates to a control apparatus for an internal combustion engine having an NOx-storage catalytic converter, especially of a motor vehicle. The control apparatus includes a model for modeling a discharge phase of the NOx-storage catalytic converter with a subdivision of an NOx-storage catalytic converter into an O2-store and an NOx-store. Furthermore, the control apparatus includes first means for determining a reducing agent mass flow which charges the O2-store and the NOx-store.

Finally, the invention relates to a control element, including a read-only memory, a random-access memory or a flash memory for such a control apparatus. A program is stored on the control element which can be run on a control apparatus, especially on a microprocessor.

BACKGROUND OF THE INVENTION

NOx-storage catalytic converters are utilized in internal combustion engines which can be operated with a lean air/fuel mixture (lambda>1) in order to store the NOx emissions which are discharged by the engine during a lean operation. Here, the NOx-storage catalytic converter is in the so-called storing phase. The efficiency of the NOx-storage catalytic converter reduces with increasing duration of the storing phase, which leads to an increase of the NOx emissions rearward of the NOx-storage catalytic converter. The cause for this reduction of the efficiency is the increase of the nitrogen oxide (NOx) fill level of the NOx-storage catalytic converter. The NOx fill level can be monitored and a discharge phase or a regeneration phase of the NOx-storage catalytic converter can be initiated when a pregiven threshold value is exceeded. A nitrogen oxide NOx storage model can be utilized to determine the NOx fill level of the NOx-storage catalytic converter. NOx storage models are generally known from the state of the art. In an NOx storage model, the NOx fill level can be modeled from parameters which define the operating point of the engine. These parameters include, for example, the supplied fuel mass or air mass, the torque, et cetera.

During the discharge phase, a reducing agent is added to the exhaust gas of the internal combustion engine which reduces the stored nitrogen oxides to nitrogen (N) and carbon dioxide (CO2). Hydrocarbons (HC), carbon monoxide (CO) and/or hydrogen (H2) can be used as reducing agents. These reducing agents can be generated by a rich adjustment of the air/fuel mixture in the exhaust gas (homogeneous operation of the internal combustion engine). HC, CO and H2 are also characterized as rich gases. Alternatively, urea can be added to the exhaust gas as a reducing gas. Ammonia from the urea is used to reduce the nitrogen oxide to nitrogen and carbon dioxide. The ammonia can be obtained from a urea solution by hydrolysis.

Toward the end of the discharge phase, a large part of the stored nitrogen oxide is reduced and less and less of the reducing agent impinges on nitrogen oxide which it can reduce to nitrogen and carbon dioxide. As a consequence, toward the end of the discharge phase, the component of the reducing agent increases in the exhaust gas rearward of the NOx-storage catalytic converter; the component of oxygen in the exhaust gas rearward of the NOx-storage catalytic converter reduces. The end of the discharge phase can then be initiated from an analysis of the exhaust gas rearward of the NOx-storage catalytic converter by suitable exhaust-gas sensors (for example, O2 sensor or NOx sensor) when the greater part of the nitrogen oxide has been discharged from the NOx-storage catalytic converter. Furthermore, it is known to determine the NOx fill level of the NOx storage catalytic converter by means of a discharge model and to therewith determine, model-supported, the end of the discharge phase.

The end of the regeneration phase must be determined as accurately as possible because a regeneration phase which is too short does not completely empty the NOx-storage catalytic converter and, as a consequence thereof, the NOx emissions increase. On the other hand, a regeneration phase, which is too long, leads to an increase of the reducing agent emissions (rich gases or urea). An increase of the NOx emissions as well as an increase of the reducing agent emissions is harmful to the environment and should therefore be reduced to a minimum.

The use of suitable exhaust-gas sensors for analyzing the exhaust gas rearward of the NOx-storage catalytic converter and to fix the end of a regeneration phase is relatively complex and expensive. In the known model-supported methods for determining the end of the regeneration phase, a reducing agent mass flow is determined from a composition (lambda) of the air/fuel mixture and an air mass is supplied to the engine for combustion. This reducing agent mass flow is converted to a mass flow via a temperature-dependent factor in dependence upon which a reduction of the NOx, which is stored in the NOx-storage catalytic converter, is computed during the lean operation of the engine.

This modeling has the disadvantage that it is relatively inaccurate and is useful only to a certain extent to determine the end of a regeneration phase. This has its cause especially in that the reducing agent likewise reduces stored O2 in addition to the stored NOx during the regeneration phase. Which stored gas (NOx or O2) is actually reduced at a specific time point during the regeneration phase is dependent upon the type of construction of the NOx-storage catalytic converter. Accordingly, it cannot be determined from the discharge model known from the state of the art which gas at which time point and how much is reduced during the regeneration phase.

SUMMARY OF THE INVENTION

Accordingly, the present invention has as its basis the task to model reliably and accurately and with the least possible complexity a discharge phase of an NOx-storage catalytic converter.

To solve this task, the invention proceeds from the method of the initially-mentioned kind and suggests that the O2-store is modeled via a first integrator for oxygen (O2) and the NOx-store is modeled via a second integrator for nitrogen oxide (NOx) and the first integrator and the second integrator are charged with the reducing agent mass flow in accordance with an apportioning factor. The apportioning factor is determined in dependence upon the O2-store content and the NOx-store content of the NOx-storage catalytic converter.

According to the invention, the fact is taken into account via the introduction of the apportioning factor that various stored gases (NOx and/or O2) can be reduced by different amounts in dependence upon the type of configuration of the NOx-storage catalytic converter at different time points during the regeneration phase. The first integrator for O2 and the second integrator for NOx are charged with the reducing agent mass flow in dependence upon the apportioning factor. The apportioning factor is determined from the state of the particular components (O2-store content and NOx-store content), which are to be reduced, that is, in dependence upon a first integrator value of the first integrator for O2 and of a second integrator value of the second integrator for NOx. The integrator values are therefore fed back in order to compute the apportioning factor.

According to the method of the invention, the reducing agent mass flow is subdivided to the individual components to be reduced in order to be able to precisely describe the NOx-store content. Based on a high modeling accuracy of the method, a control (open loop and/or closed loop) of the regeneration phase is made possible which is optimal with respect to emission and fuel consumption. The modeling method of the NOx discharge can be applied for controlling (open loop and/or closed loop) or diagnosing the catalytic converter. The method can, however, also be utilized for making a check as to plausibility or for the correction of sensor signals, for example, the signals of exhaust-gas sensors which serve to analyze the exhaust gas, which discharges rearward of the NOx storage catalytic converter, and for determining the end of the regeneration phase.

The reducing agent mass flow can be determined in any desired way. This mass flow can, for example, be measured by means of a suitable sensor. According to an advantageous further embodiment of the present invention, it is, however, suggested that the reducing agent mass flow be determined from a composition of the air/fuel mixture and an air mass flow supplied to the engine for combustion.

According to a preferred embodiment of the present invention, it is suggested that an exhaust-gas mass flow of the engine be determined from the air mass flow supplied to the engine for combustion and the reducing agent mass flow be determined from the composition of the air/fuel mixture and the exhaust-gas mass flow. The total reducing agent mass flow can be determined from the exhaust-gas mass flow via multiplication by (1.0/lambda−1.0).

According to another advantageous embodiment of the invention, it is suggested that a degree of efficiency be introduced with which the reducing agent mass flow, which is determined from the composition, is weighted. The determined total reducing agent mass flow is charged with the degree of efficiency and yields the effective reducing agent mass flow which actually participates in the conversion of the stored components (NOx, O2). The reducing agent slip, that is, the part of the reducing agent, which does not impinge on the NOx or O2 in the NOx-storage catalytic converter and is again discharged from the catalytic converter at the rear thereof, is detected by the introduction of the degree of efficiency and increases the accuracy of the modeling method of the invention. The efficiency is advantageously determined by means of a characteristic line or characteristic field in dependence upon the exhaust-gas mass flow.

According to another preferred embodiment of the present invention, it is suggested that the temperature in the NOx-storage catalytic converter be considered in the determination of the O2-store content of the O2-store. The method of the invention according to this embodiment makes possible a control (open loop and/or closed loop) of the regeneration phase which is optimal with respect to emission and fuel consumption because the temperature-dependent component of the reducing agent is considered which component is needed for the emptying of the O2-store.

As a further solution of the task of the present invention, a suggestion is made starting from the model of the type initially mentioned herein that the model has a first integrator for oxygen (O2) as an O2-store and a second integrator for nitrogen oxide (NOx) as an NOx-store and the model further has an apportioning factor dependent upon the O2-store content and the NOx-store content of the NOx-storage catalytic converter. The first integrator and the second integrator are charged with the reducing agent mass flow in accordance with the apportioning factor.

Finally, for solving the task of the present invention, the suggestion is made and starting from the control apparatus of the type mentioned initially herein, that the control apparatus include a first integrator for oxygen (O2) as an O2-store and a second integrator for nitrogen oxide (NOx) as an NOx-store and the control apparatus further includes second means for determining an apportioning factor in dependence upon the O2-store content and the NOx-store content of the NOx-storage catalytic converter. The first integrator and the second integrator are chargeable with the reducing agent mass flow in accordance with the apportioning factor.

Of special significance is the realization of the method of the invention in the form of a control element which is provided for a control apparatus of an internal combustion engine, especially of a motor vehicle. A program is stored on the control element which is capable of being run on a computing apparatus, especially on a microprocessor, and is suitable for carrying out the method of the invention. In this case, the invention is therefore realized by a program stored on the control element so that this control element, which is provided with the program, represents the invention in the same way as the method whose execution the program is suitable for. As a control element, especially an electronic storage medium can be utilized, for example, a read-only-memory, a random-access-memory or a flash memory.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
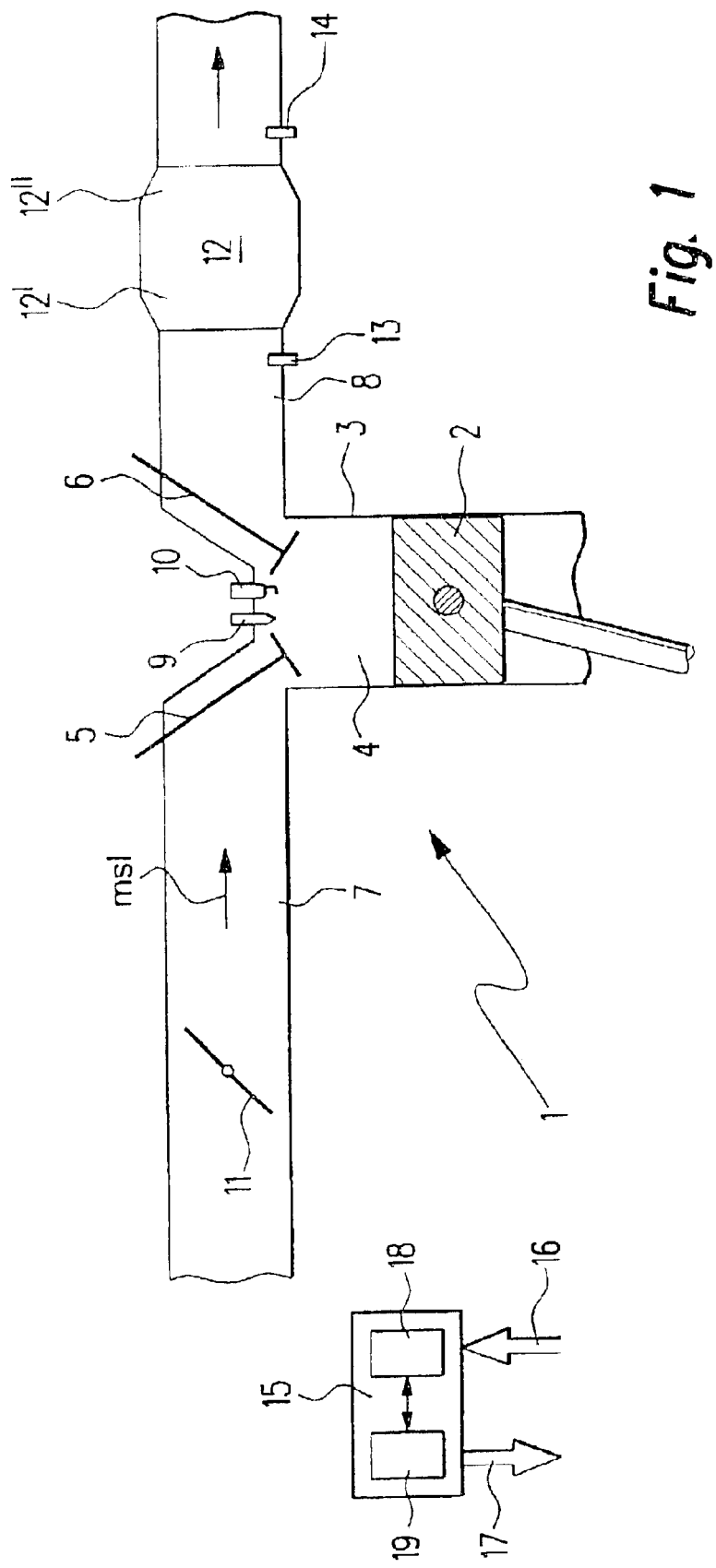
FIG. 1 shows a schematic block diagram of an internal combustion engine of the invention in accordance with a preferred embodiment.

In FIG. 1, a direct injecting internal combustion engine 1 of a motor vehicle is shown wherein a piston 2 is movable back and forth in a cylinder 3. The cylinder 3 is provided with a combustion chamber 4 which is delimited, inter alia, by the piston 2, an inlet valve 5 and an outlet valve 6. An intake manifold 7 is coupled to the inlet valve 5 and an exhaust-gas pipe 8 is coupled to the outlet valve 6.

A fuel injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10.

A rotatable throttle flap 11 is mounted in the intake manifold 7 and air can be supplied via the throttle flap to the intake manifold 7. The supplied air mass flow msl is dependent upon the angular position of the throttle flap 11. The air mass flow msl can be determined with the aid of an air mass sensor (not shown) or based on the position of the throttle flap 11. A catalytic converter 12 is accommodated in the exhaust-gas pipe 8 and the catalytic converter cleans the exhaust gases arising from the combustion of the fuel. The catalytic converter 12 is a nitrogen oxide (NOx)-storage catalytic converter 12' which is coupled to a three-way catalytic converter 12' as an oxygen store. Alternatively, the catalytic converter 12 can, however, also include only an NOx-storage catalytic converter 12'.

Input signals 16 are applied to a control apparatus 15 and these signals define operating variables of the engine 1 measured by means of sensors. The control apparatus 15 generates output signals 17 with which the performance of the engine 1 can be influenced via actuators or positioning devices. The control apparatus 15 is, inter alia, provided to control (open loop and/or closed loop) the operating variables of the engine 1. For this purpose, the control apparatus 15 is provided with a microprocessor 18 which has a program stored in a control element which is suitable to execute the above-mentioned control (open loop and/or closed loop). The control element 19 is preferably configured as an electronic storage medium, especially as a flash memory.

In a first operating mode, a so-called homogeneous operation of the engine 1, the throttle flap 11 is partially opened or partially closed in dependence upon the desired torque. The fuel is injected into the combustion chamber 4 during an induction phase caused by the piston 2. The injected fuel is swirled by the air inducted simultaneously via the throttle flap 11 and is thereby uniformly distributed in the combustion chamber 4. Thereafter, the air/fuel mixture is compressed during the compression phase in order to then be ignited by the spark plug 10. The piston 2 is driven by the expansion of the ignited fuel. In homogeneous operation, the arising torque is dependent, inter alia, on the position of the throttle flap 11. The air/fuel mix is adjusted as closely as possible to lambda=1 with respect to a low development of toxic substances.

In a second mode of operation, a so-called stratified operation of the internal combustion engine 1, the throttle flap 11 is opened wide, that is, a large air mass flow msl is supplied to the combustion chamber 4 for combustion. The fuel is injected into the combustion chamber 4 by the injection valve 9 during a compression phase caused by the piston 2 and is injected spatially in the direct vicinity of the spark plug 10 as well as at a suitable spacing in time ahead of the ignition time point. The fuel is then ignited with the aid of the spark plug 10 so that the piston 2 is driven in the next work phase by the expansion of the ignited fuel. The occurring torque is substantially dependent on the injected fuel mass in the stratified operation. Essentially, the stratified operation is provided for the idle operation and the part load operation of the internal combustion engine 1. In the stratified operation, the lambda is usually >1.

During a storing phase of the NOx-storage catalytic converter 12', the internal combustion engine 1 is operated in the stratified operation and the storage catalytic converter 12' is charged with nitrogen oxides and with oxygen. In a regeneration phase or discharge phase, the NOx-storage catalytic converter 12' is again discharged so that it can again pick up nitrogen oxide (NOx) and/or oxygen (O2) during the next stratified operation. During the regeneration phase, a reducing agent is inputted into the exhaust gas ahead of the catalytic converter 12. As a reduction agent, the following can, for example, be used: hydrocarbons (HC), carbon monoxide (CO) or urea. Hydrocarbons and carbon monoxide are generated in the exhaust gas by a rich mixture adjustment (operation of the engine in homogeneous operation). Urea can be metered in a controlled manner from a supply vessel to the exhaust gas.

During the regeneration phase of the catalytic converter 12, the following processes take: the reducing agent reduces the stored nitrogen oxides to nitrogen (N) and carbon dioxide (CO2). These substances exit from the catalytic converter 12 so that an oxygen excess results behind the catalytic converter 12 during the regeneration phase even though the engine 1 is operated with a rich air/fuel mixture (oxygen deficiency).

An oxygen (O2)-sensor 13 is mounted ahead of the catalytic converter 12 and a nitrogen oxide (NOx)-sensor 14 is mounted downstream of the catalytic converter 12 in the exhaust-gas pipe 8. After the switchover to oxygen deficiency (operation of the engine 1 with rich mixture) ahead of the catalytic converter 12 at the start of the regeneration phase, the O2-sensor 13 reacts virtually without delay. The oxygen storage positions of the catalytic converter 12 are at first almost all occupied because of the oxygen excess in the exhaust gas which is present during the stratified operation (lean air/fuel mixture) After the switchover to oxygen deficiency (rich air/fuel mixture) at the start of the regeneration phase, the oxygen storage positions are successively liberated from oxygen and this oxygen then exits from the catalytic converter 12. For this reason, there is at first still an oxygen excess behind the catalytic converter 12 after the switchover into the regeneration phase. After a time span, which is dependent upon the storage capability of the NOx-storage catalytic converter 12', the total nitrogen oxide (NOx), which is stored in the storage catalytic converter 12', is reduced and the total stored oxygen (O2) is removed so that an oxygen deficiency occurs also rearward of the catalytic converter 12. The end of the regeneration phase can be initiated by an analysis of the exhaust gas rearward of the NOx-storage catalytic converter 12' via suitable exhaust-gas sensors when the larger portion of the nitrogen oxide (NOx) has been discharged from the NOx-storage catalytic converter 12'.

Figure 2:
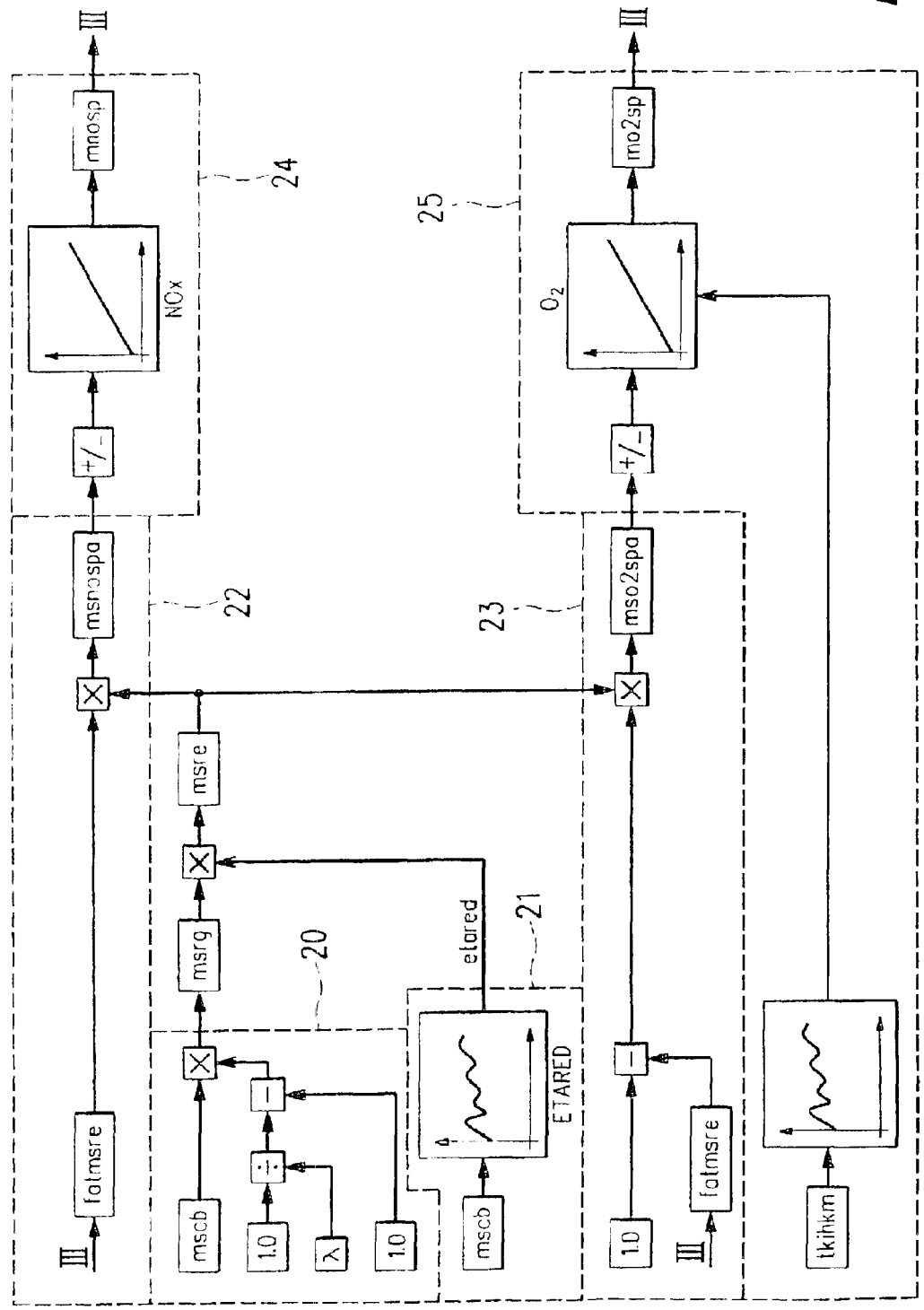
FIG. 2 is a first detail of a schematic configuration of a model of the invention in accordance with a preferred embodiment; and, FIG. 3 is a second detail of a schematic configuration of the model of the invention in accordance with a preferred embodiment.
Figure 3:
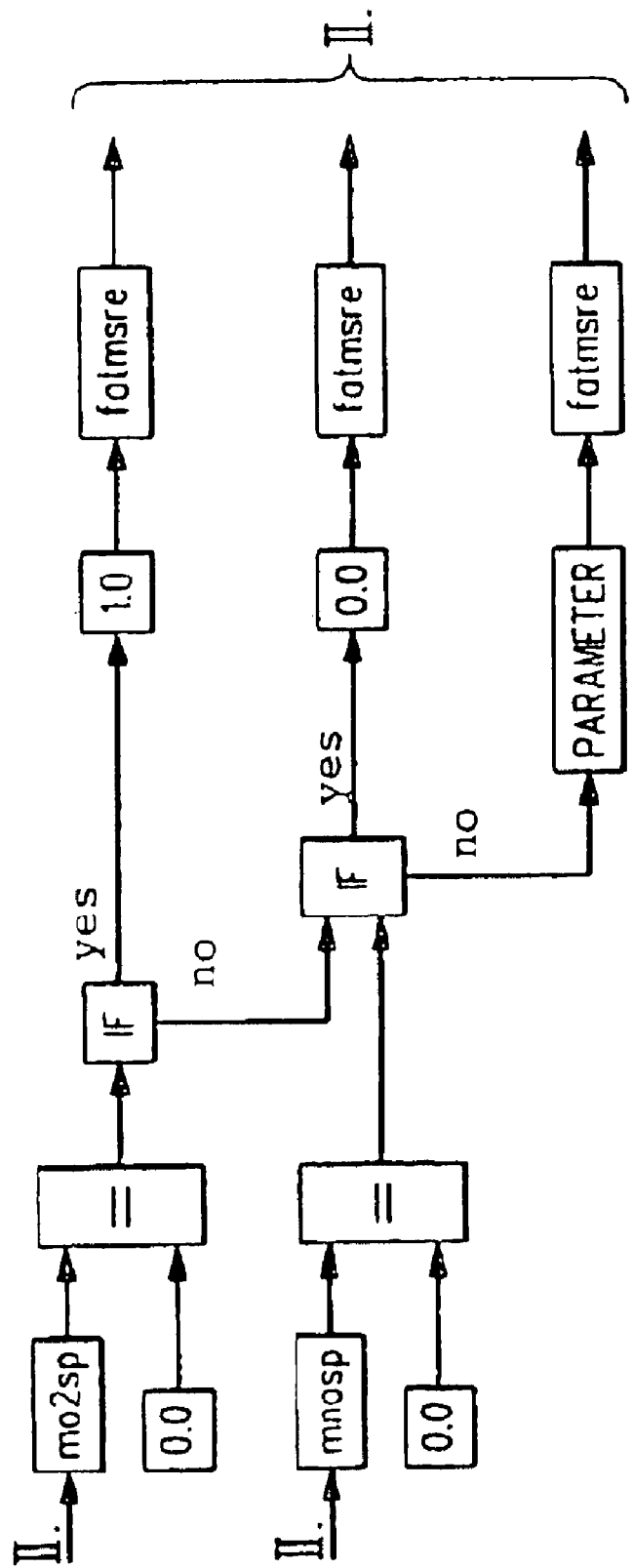

According to the invention, a discharge model is suggested and is shown in FIGS. 2 and 3 via which the regeneration phase of the NOx-storage catalytic converter 12' can be especially reliably and precisely modeled. For modeling the discharge phase, a modeling method is implemented, for example, in the control apparatus 15 of the internal combustion engine 1. For this purpose, a program is stored in the control element 19 which can be run on the microprocessor 18 and is suitable to execute the modeling method according to the invention.

The result of the modeling can, for example, be applied for the control (open loop and/or closed loop) or for the diagnosis (detecting the deterioration or poisoning) of the catalytic converter 12. However, the result can also be utilized for making a check as to plausibility or for correction of sensor signals, for example, the signals of the NOx sensor 14 which serve to determine the end of the regeneration phase.

The discharge model of the invention is shown in FIGS. 2 and 3 and is explained in greater detail in the following based on these figures. In a first function block 20, the total reducing agent mass flow msrg is determined which is supplied to the NOx-storage catalytic converter 12' during the regeneration phase. The total reducing agent mass flow msrg results from the equation:

$$msrg = msab \cdot (1.0/lambda - 1.0),$$

with the exhaust-gas mass flow msab and the composition lambda of the air/fuel mixture.

The exhaust-gas mass flow msab is determined from the air mass flow msl supplied to the engine 1 for combustion. The exhaust-gas mass flow msab is the time delayed air mass flow msl corrected for density (because of the great temperature dependency).

In a function block 21, an efficiency etared is determined which is multiplied in the further course by the total reducing agent mass flow msrg to the effective reducing agent flow msre which actually participates in the conversion of the stored components (NOx, O2). With the degree of efficiency etared, the fact can be taken into account that not the total reducing agent mass flow msrg impinges on the NOx or O2, which are to be reduced, during the regeneration phase in the NOx-storage catalytic converter 12', but that a part of the total reducing agent mass flow msrg leaves the catalytic converter 12 without reacting with the NOx or O2. The degree of efficiency etared is determined from the exhaust-gas mass flow msab by means of an applied characteristic line ETARED. The characteristic line ETARED can, in advance of the modeling, be determined empirically.

The effective reducing agent mass flow msre is multiplied in a function block 22 by an apportioning factor fatmsre to a component msnospa of the effective reducing agent mass flow which reacts with the NOx in the catalytic converter 12. Likewise, the effective reducing agent mass flow msre is multiplied in a function block 23 by a difference of 1.0 and the apportioning factor fatmsre to a component mso2spa of the effective reducing agent mass flow which reacts with O2 in the catalytic converter 12. The effective reducing agent mass flow is therefore apportioned by the apportioning factor fatmsre to the NOx-store and the O2-store. The apportioning factor fatmsre is dependent upon the fill level of the NOx-store and O2-store, respectively. The apportioning factor fatmsre defines an essential part of the model of the invention. The determination of the apportioning factor fatmsre is shown in FIG. 3 and is explained in greater detail hereinafter.

The NOx-store and the O2-store are each represented by their own integrators in the discharge model according to the invention. In a function block 24, the component msnospa of the effective reducing mass flow is supplied to an NOx integrator in order to determine the NOx-storage content mnosp. Likewise, the component mso2spa of the effective reducing agent mass flow is supplied to an O2 integrator in a function block 25 in order to determine the O2-store content mo2sp. The O2 storage capability of the catalytic converter 12 is greatly dependent upon temperature. For this reason, the temperature tkihkm behind the catalytic converter 12 is considered in the computation of the O2-store content.

The NOx-store content mnosp and the O2-store content mo2sp are applied in FIG. 3 to determine the apportioning factor fatmsre. In the event that the O2-store content mo2sp is equal to 0 (0.0), that is, in the event that the O2-store is already completely emptied, the apportioning factor fatmsre is selected equal to 1 (1.0). The apportioning factor fatmsre, which is determined in FIG. 3, is then supplied to the function blocks 22 and 23 in FIG. 2. This means that the total effective reducing agent flow msre reaches via the function block 22 the NOx-store in the function block 24 and there participates in the reduction of the NOx.

In FIG. 3, in the event that the O2-store content mo2sp is not equal to 0 (0.0), a check is made as to whether the NOx-store content mnosp is equal to 0 (0.0), that is, whether the NOx-store is already completely emptied. If yes, then the apportioning factor fatmsre is selected equal to 0 (0.0). This means that in FIG. 2, the total effective reducing agent flow msre reaches via the function block 23 the O2-store in the function block 25 and there participates in the breakdown of the O2.

In FIG. 3, in the event that the NOx-store content mnosp is not equal to 0 (0.0), the apportioning factor fatmsre is selected equal to a desired PARAMETER between 0 and 1. The PARAMETER can be determined in advance of a modeling via simulation or empirically during the operation of the internal combustion engine 1. The PARAMETER can vary in dependence upon the fill level of the NOx-store and/or of the O2-store. The PARAMETER can change linearly with the fill level or in any other desired way with the fill level.

What is claimed is:

1. A method for modeling a discharge phase of a nitrogen oxide (NOx)-storage catalytic converter of an internal combustion engine, including an internal combustion engine of a motor vehicle, the method comprising the steps of:
   subdividing said (NOx)-storage catalytic converter into an oxygen (O2)-store and a nitrogen oxide (NOx)-store;
   determining a reducing agent mass flow (msrg) charging said (O2)-store and said (NOx)-store;
   modeling said (O2)-store with a first integrator for oxygen (O2) and modeling said (NOx)-store with a second integrator for nitrogen oxide (NOx);
   charging said first integrator and said second integrator proportionally with said reducing agent mass flow (msrg) in accordance with an apportioning factor (fatmsre); and,
   determining said apportioning factor (fatmsre) in dependence upon the content (mo2sp) of said (O2)-store and the content (mnosp) of said (NOx)-store.

2. The method of claim 1, wherein the temperature (tkihkm) in the NOx-storage catalytic converter is considered in the determination of the O2-store content of the O2-store.

3. The method of claim 1, comprising the further step of determining the reducing agent mass flow (msrg) from a composition (lambda) of the air/fuel mixture and from an air mass flow (msl) supplied to the internal combustion engine for combustion.

4. The method of claim 3, comprising the further step of determining an exhaust-gas mass flow (msab) of the internal combustion engine from the air mass flow (msl) supplied to the engine for combustion and determining the reducing agent mass flow (msrg) from the composition (lambda) of the air/fuel mixture and the exhaust-gas mass flow (msab).

5. The method of claim 4, comprising the further step of introducing a degree of efficiency (etared), with which the reducing agent mass flow (msrg) determined from the composition (lambda) is weighted.

6. The method of claim 4, comprising the further step of determining the degree of efficiency (etared) by means of a characteristic line (ETARED) or a characteristic field in dependence upon the exhaust-gas mass flow (msab).

7. A control apparatus for an internal combustion engine having a nitrogen oxide (NOx)-storage catalytic converter, the control apparatus comprising:

a model for modeling a discharge phase of the NOx-storage catalytic converter with a subdivision of the NOx-storage catalytic converter into an oxygen (O2)-store and a nitrogen oxide (NOx)-store;

first means for determining a reducing agent mass flow (msrg) charging the O2-store and the NOx-store;

a first integrator for oxygen (O2) as an O2-store and a second integrator for nitrogen oxides (NOx) as an NOx-store;

second means for determining an apportioning factor (fatmsre) in dependence upon the O2-store content (mo2sp) and on the NOx-store content (mnosp) of the NOx-storage catalytic converter; and, said first integrator and the second integrator being charged proportionally with the reducing agent mass flow (msrg) in accordance with the apportioning factor (fatmsre).

8. The control apparatus of claim 7, wherein said internal combustion engine is an internal combustion engine of a motor vehicle.

9. A control element for a control apparatus of an internal combustion engine, the control element comprising a program stored thereon which can be run on a computing apparatus including a microprocessor, the program being suitable for executing a method for modeling a storing phase of a nitrogen oxide (NOx)-storage catalytic converter of an internal combustion engine including an internal combustion engine of a motor vehicle, the method including the steps of:

subdividing said (NOx)-storage catalytic converter into an oxygen (O2)-store and a nitrogen oxide (NOx)-store;

determining a reducing agent mass flow (msrg) charging said (O2)-store and said (NOx)-store;

modeling said (O2)-store with a first integrator for oxygen (O2) and modeling said (NOx)-store with a second integrator for nitrogen oxide (NOx);

charging said first integrator and said second integrator proportionally with said reducing agent mass flow (msrg) in accordance with an apportioning factor (fatmsre); and, determining said apportioning factor (fatmsre) in dependence upon the content (mo2sp) of said (O2)-store and the content (mnosp) of said (NOx)-store.

10. The control element of claim 9, wherein said control element is one of the following: a read-only-memory, a random-access-memory and a flash memory.

11. The control element of claim 9, wherein said internal combustion engine is an internal combustion engine of a motor vehicle.

12. A model for modeling a discharge phase of a nitrogen oxide (NOx)-storage catalytic converter of an internal combustion engine, including an internal combustion engine of a motor vehicle, the model comprising:

a subdivision of the NOx-storage catalytic converter into an oxygen (O2)-store and a nitrogen oxide (NOx)-store;

a reducing agent mass flow (msrg) which charges the O2-store and the NOx-store;

a first integrator for oxygen (O2) as an O2-store and a second integrator for nitrogen oxides (NOx) as an NOx-store;

an apportioning factor (fatmsre) dependent upon the O2-store content (mo2sp) and the NOx-store content (mnosp) of the NOx-storage catalytic converter; and, the first integrator and the second integrator being chargeable proportionally by the reducing agent mass flow (msrg) in accordance with the apportioning factor (fatmsre).

* * * * *